US008328240B2

(12) United States Patent
Stone

(10) Patent No.: US 8,328,240 B2
(45) Date of Patent: Dec. 11, 2012

(54) BULKHEAD FITTING

(75) Inventor: Jon Terence Stone, Clemmons, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 374 days.

(21) Appl. No.: 12/535,076

(22) Filed: Aug. 4, 2009

(65) Prior Publication Data

US 2011/0031740 A1 Feb. 10, 2011

(51) Int. Cl.
*F16L 27/00* (2006.01)
(52) U.S. Cl. .................. 285/139.1; 285/139.3; 285/208
(58) Field of Classification Search ............... 285/139.1, 285/139.2, 139.3, 206, 208
See application file for complete search history.

(56) References Cited

U.S. PATENT DOCUMENTS

| | | | |
|---|---|---|---|
| 3,238,876 A | 3/1966 | Allen | |
| 3,247,999 A * | 4/1966 | Stilwell | 220/62.21 |
| 4,655,482 A | 4/1987 | Myers et al. | |
| 4,836,558 A | 6/1989 | Anderson et al. | |
| 5,551,590 A | 9/1996 | Mazur et al. | |
| 6,293,595 B1 | 9/2001 | Marc et al. | |
| 6,508,490 B1 | 1/2003 | Hoffman | |
| 7,374,212 B1 | 5/2008 | Gretz | |
| 2008/0030021 A1 | 2/2008 | Theilen | |

FOREIGN PATENT DOCUMENTS

EP 2282097 2/2011

OTHER PUBLICATIONS

Hayward Flow Control Systems 2008 New Product Guide pp. 19-20, Publication No. NPG-01 (Mar. 2008) (2 pages).
Response to European Search Report filed on Aug. 5, 2011 with the European Patent Office in connection with European Patent Application No. 10171496.2 (6 pages).
Extended European Search Report from European Patent Application No. 10171496.2 dated Dec. 6, 2010 (5 pages).

* cited by examiner

*Primary Examiner* — Aaron Dunwoody
(74) *Attorney, Agent, or Firm* — McCarter & English, LLP

(57) ABSTRACT

Disclosed herein is a bulkhead fitting. The bulkhead fitting includes biasing means and a plurality of guide rings. In a preferred embodiment, a first guide ring is provided with an annular sidewall and a base extending radially outward from the sidewall, and a second guide ring is configured to mate with the first guide ring. Biasing means is positioned between the guide rings and radially outward of the sidewall to allow expansion and contraction of the first and second guide rings relative to one another, while preventing or inhibiting the biasing means from catching in the threads of the shaft or otherwise contacting the shaft.

22 Claims, 5 Drawing Sheets

BULKHEAD FITTING

FIELD OF THE INVENTION

The present invention relates to a bulkhead fitting. More specifically, the invention relates to apparatus providing a substantially constant compression.

BACKGROUND OF THE INVENTION

Bulkhead fittings are a particular type of fitting used to create a sealed, mechanical connection through a wall, typically of a tank, or other fluid-containing vessel. The threaded versions of these fittings may include a body, a gasket, and a nut. Flange-type bulkhead fittings are also commercially available. Bulkhead fittings are typically constructed from metals and thermoplastics. The prior art includes U.S. Pat. No. 5,551,590, for example, which discloses a non-metallic pressure vessel fitting.

Tanks, especially those manufactured from thermoplastics, react mechanically to thermal changes due to temperature changes in the surrounding atmosphere, changes in temperature of the fluid contained in the tank, and changes due to solar heating. Additionally, tanks react mechanically to changes in internal pressure and changes in static head pressure of the fluid contained in the tank. These mechanical reactions can be generally described as (a) an expansion, or increase, in the tank dimensions due to increases in temperature and/or pressure, and (b) contraction, or a decrease, in tank dimensions due to decreases in temperature and/or pressure. Expansion of the tank dimensions results in a reduction of the wall thickness of the vessel, while contraction of the tank dimensions results in an increase of the wall thickness of the vessel.

As thermoplastic tank dimensions change, especially wall thickness, the initial compression imparted on the gasket may be affected. In particular as the tank expands, reducing wall thickness, a subsequent reduction in the initial compression imparted on the gasket may result in loosening of the fitting with the potential for a leak forming around the gasket. Further, as gasket compression is reduced by the continuous cycles of expansion and contraction, the load initially imparted between the threads of the nut and the threads of the body may be reduced. This may also result in the loosening of the fitting and the formation of potential leaks around the gasket.

Further, if the bulkhead fitting is manufactured from thermoplastic materials, the bulkhead fitting is subject to the same expansion and contraction changes that are imparted on the tank. Thus, the bulkhead fitting will be expanding at the same time the wall of the tank is getting thinner, exacerbating the decrease in the initial compression imparted on the gasket. If the fitting is manufactured from a thermoplastic material that has a coefficient of thermal expansion and contraction substantially different from the tank material, dimensional changes due to thermal or pressure changes may result in a further decrease in the initial compression imparted on the gasket. Additionally, the thermal expansion of the piping system attached to the bulkhead fitting can be of concern.

Also, if a bulkhead fitting is exposed to constant and excessive vibration, independent of, or combined with, physical changes in the tank due to thermal, or pressure changes, the bulkhead fitting may become loose, especially the nut portion of the bulkhead fitting. What is needed in the art is a bulkhead fitting that maintains a substantially constant pressure or constant compression on the gasket, in multiple conditions of use.

SUMMARY OF THE INVENTION

Preferred embodiments of the invention overcome these and/or other disadvantages and shortcomings of the prior art by providing an improved bulkhead fitting such that the bulkhead fitting provides a substantially constant compression. The bulkhead fitting comprises a body with a threaded shaft that extends through a tank wall and has a cavity to allow for fluid flow through the tank wall. The bulkhead fitting further comprises a gasket, a nut, a biasing means and a plurality of guide rings, each configured to allow the threaded shaft to extend therethrough. The plurality of guide rings can include a first guide ring with a sidewall adjacent the threads of the shaft and a base extending radially outward from the sidewall. The plurality of guide rings can include a second guide ring configured to mate with the first guide ring. A biasing means, which is preferably positionable between the first and second guide rings and radially outward of the sidewall, allows the first and second guide rings to expand and contract relative to one another, while preventing or inhibiting "catching" or "snagging" of the biasing means on the shaft threads.

In accordance with a first preferred embodiment of the invention, the first guide ring has a substantially U-shaped half cross-section, and the second guide ring has a substantially T-shaped half cross-section. In accordance with a second preferred embodiment of the invention, the first guide ring has a substantially L-shaped half cross-section, and the second guide ring has a substantially rectangularly-shaped half cross-section.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE INVENTION

Figure 1:
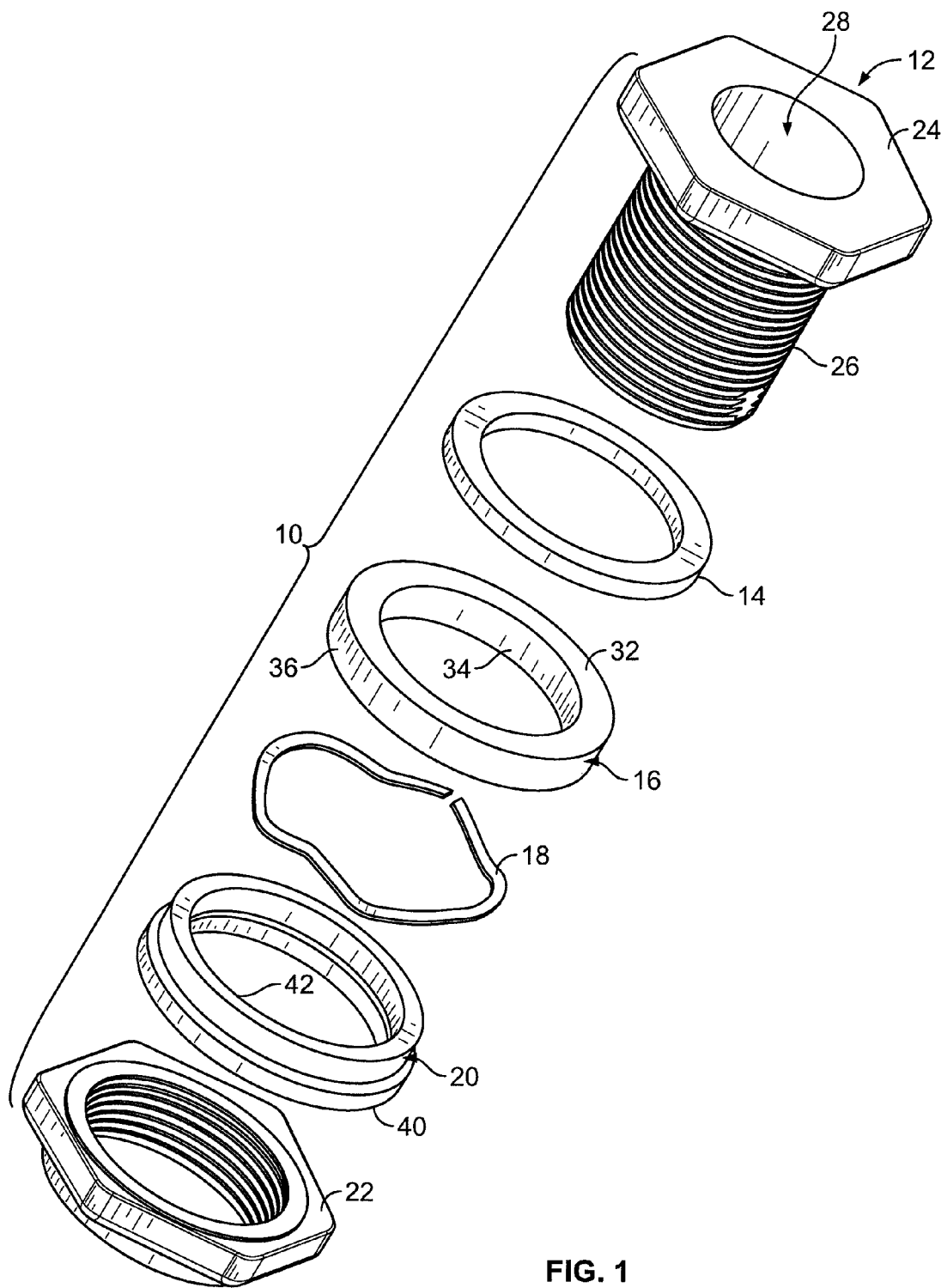
FIG. 1 is a front exploded perspective view showing a bulkhead fitting constructed in accordance with a first exemplary embodiment of the present invention, the bulkhead fitting including a lower guide ring with a half cross-section having a U-shape and an upper guide ring with a half cross-section having a T-shape.
Figure 2:
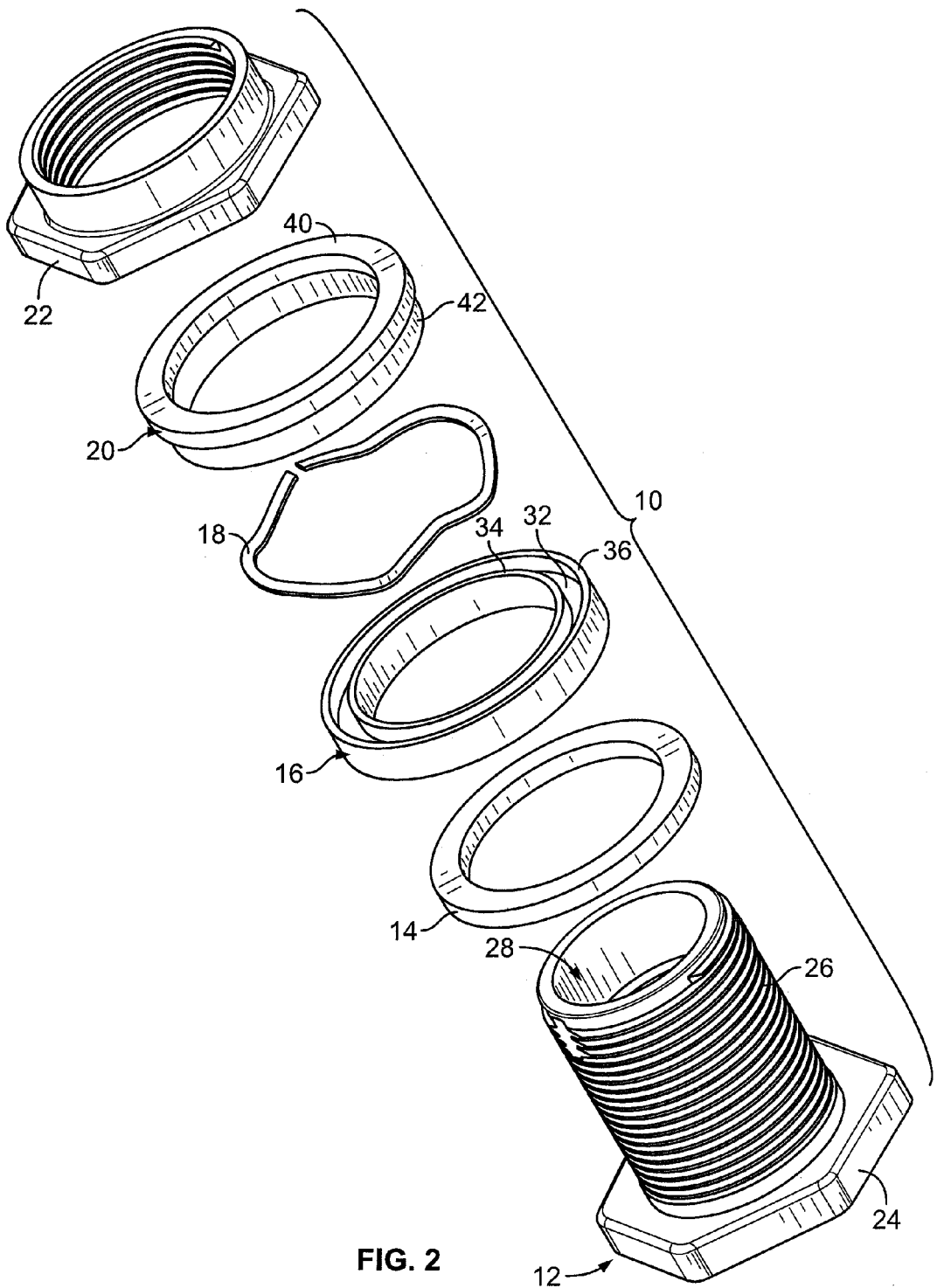
FIG. 2 is a rear exploded perspective view showing the bulkhead fitting of FIG. 1.
Figure 3:
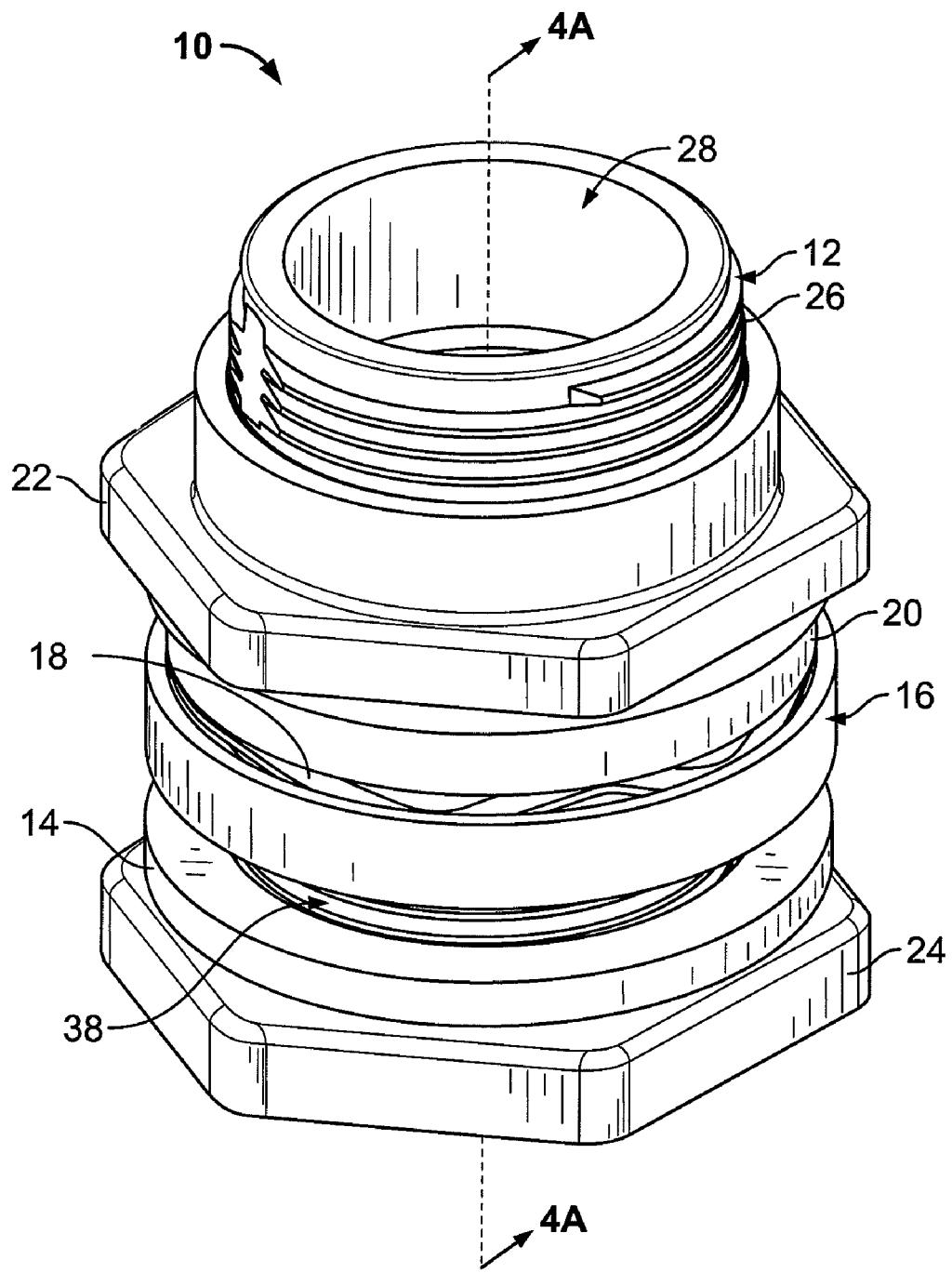
FIG. 3 is an assembly view showing the bulkhead fitting of FIGS. 1 and 2.

Referring to FIGS. 1-4B, a bulkhead fitting 10 constructed in accordance with an exemplary embodiment of the present invention is shown to include a body 12, a compression gasket 14, a first guide ring 16, a biasing means 18, a second guide ring 20, and a nut 22. Each of the body 12, the compression gasket 14, the guide rings 16, 20, the biasing means 18, and the nut 22 shall be described below.

The body 12 comprises a flange 24 and a threaded shaft 26 extending therefrom. The threaded shaft 26 defines therethrough a central axially extending passage 28 for the outflow of fluid from a tank 30. The compression gasket 14 is substantially annular with a central opening sized to receive the threaded shaft 26. In preferred embodiments, the compression gasket 14 may be an elastomer gasket.

Regarding the guide rings 16, 20, the first guide ring 16 is substantially annular in shape and sized to receive the threaded shaft 26 therethrough. The first guide ring 16 includes an annular base 32 and at least one sidewall 34. The sidewall 34 is positioned at an inner radius of the annular base 32, such that, when assembled, sidewall 34 extends substantially concentric with the threaded shaft 26. Thus the first sidewall 34 acts as inner guide for biasing means 18 to prevent or inhibit the biasing means 18 from moving inwards towards the threaded shaft 26 of the body 12. In preferred embodiments, such is the case, even when the bulkhead fitting is positioned substantially or at least partially horizontal with respect to ground. The first guide ring 16 can further include an outer sidewall 36 proximal an outer radius of the annular base 32 and concentric with the sidewall 34 and threaded shaft 26. In this regard, the first guide ring 16 can be said to have a U-shaped half cross-section. An annular gap 38 is formed between the first guide ring 16 and the gasket 14 for receiving the tank 30.

Biasing means 18 is preferably substantially annular and sized to receive the threaded shaft 26 therethrough. Biasing means 18 can include a wave spring or belleville washer, for example. The biasing means 18 is preferably formed of metal and is more preferably formed of stainless steel. While FIGS. 1-5 depict an "open" wave spring as the biasing means 18, it should be noted that the wave spring 18 can be provided as a "full" ring style. Regardless of shape or material of construction, the biasing means 18 is preferably configured to contract and expand into compressed and relaxed states, respectively.

The second guide ring 20 is preferably substantially annular, sized to receive the threaded shaft 26 and configured to mate with first guide ring 16 while the biasing means 18 is positioned therebetween. The second guide ring 20 can have a base 40 and a sidewall 42 extending radially therefrom, such that the second guide ring 20 can be said to include a half cross-section having a T-shape. In view of the sidewall 42, the second guide ring 20 and the first guide ring 16 cooperate to be spaced apart a distance (1) in which said biasing means 18 is positioned, and (2) which defines a maximum compression of the biasing means 18 (e.g., a minimum length of the biasing means 18 in a compressed state thereof).

The nut 22 is substantially annular and configured to threadably engage the threaded shaft 26 of the body 12. The body 12, the first and second guide rings 16, 20, and the nut 22 are preferably manufactured from thermoplastic materials, such as polyvinyl chloride (PVC), chlorinated polyvinyl chloride (CPVC), natural polypropylene, etc, but could also be manufactured from metal materials.

Figure 4A:
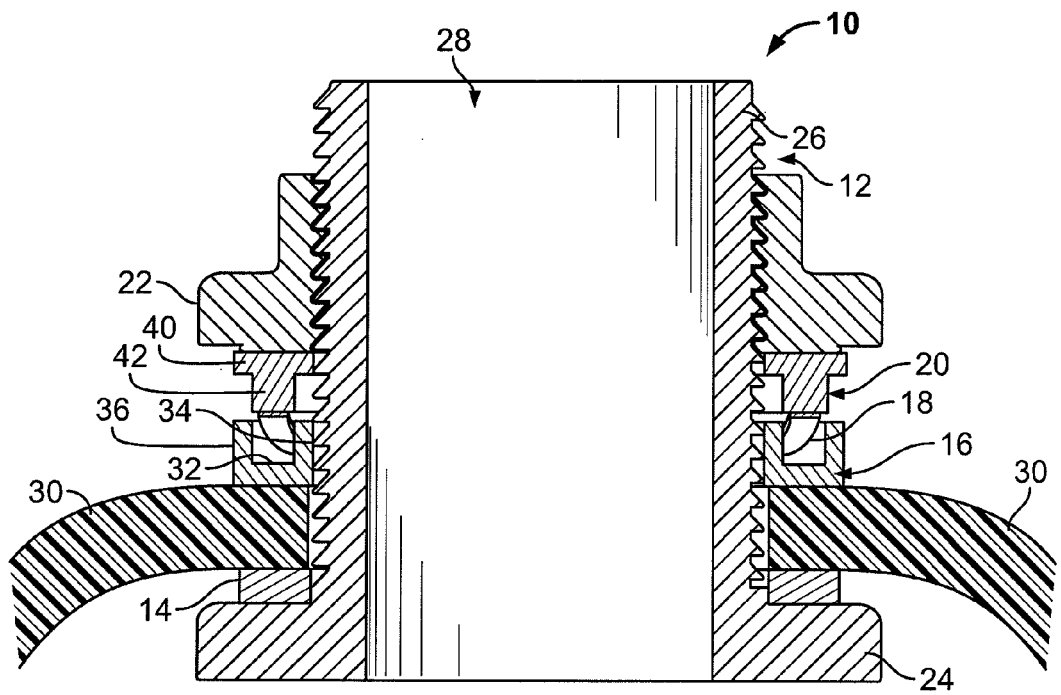
FIG. 4A is a cross-sectional view of the bulkhead fitting of FIGS. 1-3 taken along section line 4A-4A of FIG. 3 and shown in combination with a tank, the fitting being shown in a relaxed state.
Figure 4B:
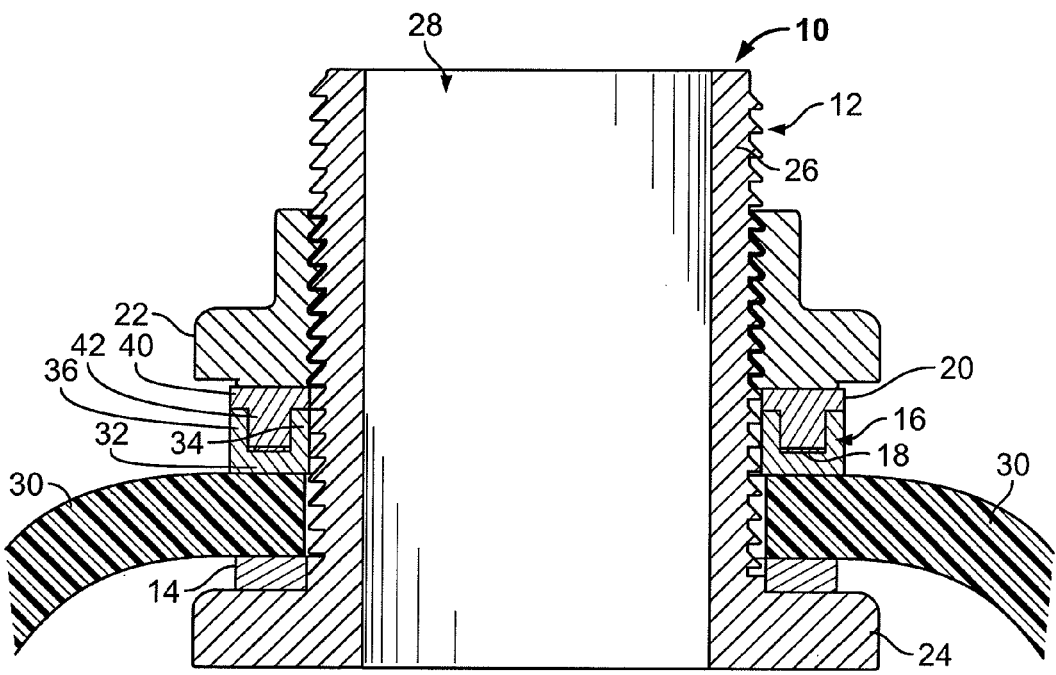
FIG. 4B is the cross-sectional view of FIG. 4A with the fitting being shown in a compressed state.

Referring to FIGS. 4A and 4B, methods of using the bulkhead fitting 10 shall be discussed with further detail. The inclusion of the biasing means 18 in the bulkhead fitting 10 acts to maintain a substantially constant compression on the compression gasket 14 and the nut 22. It is contemplated that the bulkhead fitting 10 will primarily be assembled to a predefined dimension based on the interaction of the first guide ring 16 and second guide rings 20, which will result in a predefined biasing means 18 compression that is independent of the geometry of the tank, or vessel, to which it is assembled. This configuration also allows the user the option of adjusting, e.g., reducing or increasing, the amount of biasing means 18 compression, if desired, by loosening the nut 22 of the bulkhead fitting 10. Retention of compression in compression gasket 14 inhibits leakage around the compression gasket 14, through the hole in the tank 30. Maintaining a load on the nut 22 via the compressive load transferred through the second guide ring 20 results in continuous engagement of the threaded shaft 26 of the body 12 by nut 22, preventing unwanted loosening of nut 22.

Continuing with references to FIGS. 4A and 4B, the biasing means 18, such as a wave spring or belleville washer, for example, can be flattened during installation. FIG. 4B depicts a compressed state of the biasing means 18 of the bulkhead fitting 10 and FIG. 4A depicts a relaxed state. By flattening the biasing means 18, it is at a heightened level of stored energy, and in a position to "activate" when the conditions of initial compression on compression gasket 14, or initial preload on the nut 22 change, especially in states of expansion within the system. For example, in a condition of increasing system temperature, resulting in an expansion of the tank dimensions and related decrease in the wall thickness of the tank, the biasing means 18 would "extend" from its flattened condition imparting reactive loads on the first guide ring 16 and second guide ring 20. The compressive load imparted on the second guide ring 20 would be transferred as a tensile load via the nut 22, through the body 12, which would result in a substantially constant compression on the compression gasket 14. At the same time, the compressive load imparted on the first guide ring 16 serves to keep the first guide ring 16 anchored against the tank 30. It is contemplated that a plurality of wave springs and belleville washers can be stacked to influence, e.g., increase, spring rate.

To install the bulkhead fitting 10, a mechanic or other user attaches the compression gasket 14 over the threaded shaft 26 of body 12 and adjacent to the flanged end 24 of body 12. This sub-assembly can be placed through a hole in the wall 30, such that the compression gasket 14 and the flanged end 24 of the body 12 remain inside the tank 30, with the substantially cylindrical, threaded shaft 26 of the body 12 extending through the hole in the tank 30. The first guide ring 16 is positioned about the threaded shaft 26 of body 12, and is positioned against the tank 30. The biasing means 18, is positioned adjacent the first guide ring 16 so as to be radially outward of the sidewall 34 thereof. The second guide ring 20 is positioned adjacent the biasing means 18. The nut 22 is threaded onto the threaded shaft 26 of the body 10, and is tightened, for example, until the biasing means 18 is flattened.

It is preferable for the biasing means 18 to be radially outward of thesidewall 34 so as to inhibit "snagging" or "catching" of the biasing means 18 on the threaded shaft 26. For example, as a wave spring is compressed (or expanded), the spring is prevented or inhibited from entering the grooves created by the threaded shaft 26. The geometry of the "T" and "U" shaped half cross-sections (and the geometries of FIG. 5 discussed below), for example, are shaped so that the inner annular leg, e.g., sidewall 34, acts as an inner guide for the biasing means 18 and prevents or inhibits same from moving inward to the threaded shaft 26 of the body 12, where it might catch or snag. Furthermore, in the case of the "T"-shaped half cross-section, the fitting 10 further provides an outside guide for the biasing means 18.

Preferred embodiments of the present invention are further advantageous in that compression of the biasing means 18 might occur within that distance by which the first and second guide rings 16, 20 are spaced apart by the sidewall 34 (thereby inhibiting over-compression). Furthermore, such minimum distance is preferably "fixed" and repeatable to define a maximum compression of the biasing means 18 independent of the dimensions of the tank 30 with which the fitting 10 may be assembled. Moreover, preferred embodiments of the present invention provide for user-adjustability, e.g., reducing (or increasing) the amount of spring compression, by loosening the nut 22 of the bulkhead fitting 10.

Figure 5:
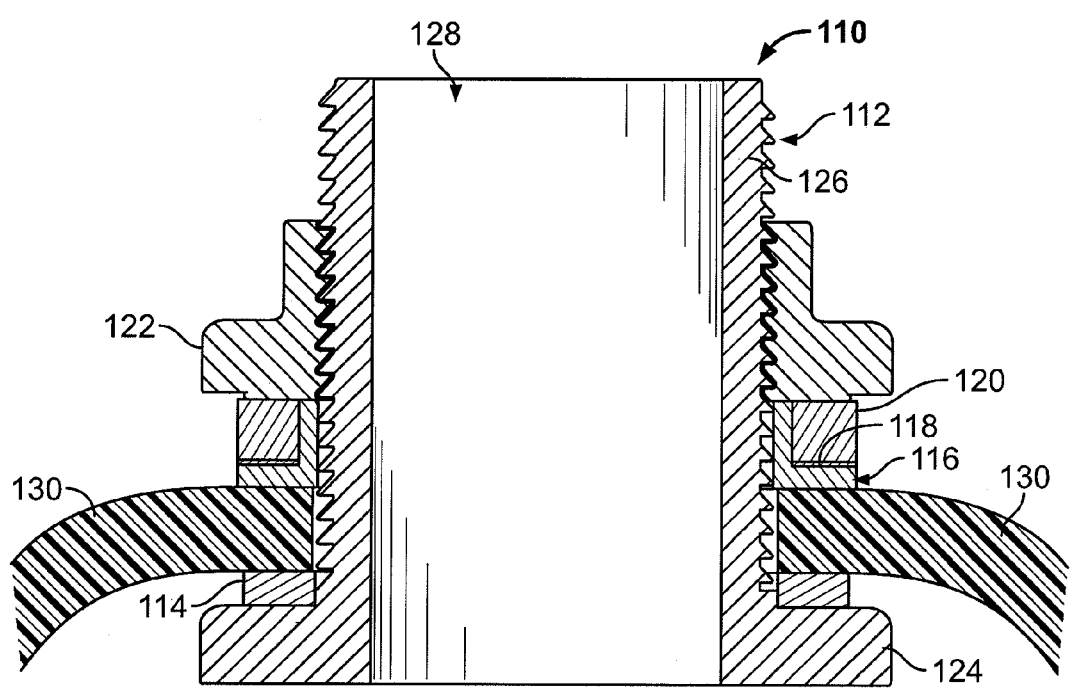
FIG. 5 is a cross-sectional view showing a bulkhead fitting constructed in accordance with a second exemplary embodiment of the present invention, the bulkhead fitting being including a lower guide ring with a half cross-section having an L-shape, and an upper guide ring with a half cross-section having a rectangular shape.

With respect to FIG. 5, a bulkhead fitting 110 is shown constructed in accordance with a second embodiment of the present invention. Elements of the bulkhead fitting 110 that are substantially the same as those described above in connection with bulkhead fitting 10 are designated with like reference numerals increased by one hundred. In the embodiment of FIG. 5, a first guide ring 116 has an "L"-shaped half cross-section and a second guide ring 120 has a rectangularly-shaped half cross-section. The second guide ring 120 is configured to mate with the first guide ring 116 while a biasing means 118 is positioned therebetween and radially outward of a sidewall of the first guide ring 120.

It will also be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined in the appended claims.

What is claimed is:

1. A bulkhead fitting, comprising:
    a body having a threaded shaft, a gasket configured to have said threaded shaft extend therethrough, and a nut configured to have said threaded shaft extend therethrough;
    a plurality of guide rings positionable between said nut and said gasket and configured to have said threaded shaft extending therethrough, said plurality of guide rings comprising (a) a first guide ring including a sidewall proximal said threaded shaft and further including a base extending radially outward from said sidewall, and (b) a second guide ring configured to mate with said first guide ring; and
    biasing means for allowing said first and second guide rings to expand and contract relative to one another;
    wherein said sidewall inhibits catching on said shaft and inhibits said biasing means from moving inwards toward said shaft.

2. The bulkhead fitting of claim 1, wherein said biasing means comprises a wave spring.

3. The bulkhead fitting of claim 1, wherein said biasing means comprises a bellville washer.

4. The bulkhead fitting of claim 1, wherein said first guide ring has a substantially L-shaped half cross-section.

5. The bulkhead fitting of claim 4, wherein said second guide ring has a substantially rectangular half cross-section.

6. The bulkhead fitting of claim 1, wherein said first guide ring has a substantially U-shaped half cross-section.

7. The bulkhead fitting of claim 6, wherein said second guide ring has a substantially T-shaped half cross-section.

8. A bulkhead fitting, comprising:
    a body having a threaded shaft, a gasket configured to have said threaded shaft extend therethrough, and a nut configured to have said threaded shaft extend therethrough;
    a plurality of guide rings positionable between said nut and said gasket and configured to have said threaded shaft extending therethrough, said plurality of guide rings comprising (a) a first guide ring including a sidewall proximal said threaded shaft and further including a base extending radially outward from said sidewall, and (b) a second guide ring configured to mate with said first guide ring; and
    biasing means for allowing said first and second guide rings to expand and contract relative to one another, wherein said biasing means comprises a wave spring.

9. The bulkhead fitting of claim 8, wherein said first guide ring has a substantially L-shaped half cross-section.

10. The bulkhead fitting of claim 9, wherein said second guide ring has a substantially rectangular half cross-section.

11. The bulkhead fitting of claim 8, wherein said first guide ring has a substantially U-shaped half cross-section.

12. The bulkhead fitting of claim 11, wherein said second guide ring has a substantially T-shaped half cross-section.

13. A bulkhead fitting, comprising:
    a body having a threaded shaft, a gasket configured to have said threaded shaft extend therethrough, and a nut configured to have said threaded shaft extend therethrough;
    a plurality of guide rings positionable between said nut and said gasket and configured to have said threaded shaft extending therethrough, said plurality of guide rings comprising (a) a first guide ring including a sidewall proximal said threaded shaft and further including a base extending radially outward from said sidewall, and (b) a second guide ring configured to mate with said first guide ring; and
    biasing means for allowing said first and second guide rings to expand and contract relative to one another, wherein said biasing means comprises a bellville washer.

14. The bulkhead fitting of claim 13, wherein said first guide ring has a substantially L-shaped half cross-section.

15. The bulkhead fitting of claim 14, wherein said second guide ring has a substantially rectangular half cross-section.

16. The bulkhead fitting of claim 13, wherein said first guide ring has a substantially U-shaped half cross-section.

17. The bulkhead fitting of claim 16, wherein said second guide ring has a substantially T-shaped half cross-section.

18. A bulkhead fitting, comprising:
    a body having a threaded shaft, a gasket configured to have said threaded shaft extend therethrough, and a nut configured to have said threaded shaft extend therethrough;
    a plurality of guide rings positionable between said nut and said gasket and configured to have said threaded shaft extending therethrough, said plurality of guide rings comprising (a) a first guide ring including a sidewall proximal said threaded shaft and further including a base extending radially outward from said sidewall, and (b) a second guide ring configured to mate with said first guide ring; and
    biasing means for allowing said first and second guide rings to expand and contract relative to one another, wherein said biasing means comprises a spring.

19. The bulkhead fitting of claim 18, wherein said first guide ring has a substantially L-shaped half cross-section.

20. The bulkhead fitting of claim 19, wherein said second guide ring has a substantially rectangular half cross-section.

21. The bulkhead fitting of claim 18, wherein said first guide ring has a substantially U-shaped half cross-section.

22. The bulkhead fitting of claim 21, wherein said second guide ring has a substantially T-shaped half cross-section.

* * * * *